US010205732B2

(12) United States Patent
Ahn et al.

(10) Patent No.: US 10,205,732 B2
(45) Date of Patent: Feb. 12, 2019

(54) METHOD, APPARATUS, SYSTEM, AND NON-TRANSITORY MEDIUM FOR PROTECTING A FILE

(71) Applicant: LINE Corporation, Shibuya-ku, Tokyo (JP)

(72) Inventors: Sungbeom Ahn, Seongnam-si (KR); SangHun Jeon, Seongnam-si (KR); Myungju Chung, Seongnam-si (KR); Dongpil Seo, Seongnam-si (KR); Seong Yeol Lim, Seongnam-si (KR); Wang Jin Oh, Seongnam-si (KR); Kwang-Hee Han, Seongnam-si (KR)

(73) Assignee: Line Corporation, Tokyo (JP)

( * ) Notice: Subject to any disclaimer, the term of this patent is extended or adjusted under 35 U.S.C. 154(b) by 180 days.

(21) Appl. No.: 15/426,167

(22) Filed: Feb. 7, 2017

(65) Prior Publication Data
US 2017/0237567 A1    Aug. 17, 2017

(30) Foreign Application Priority Data

Feb. 11, 2016    (KR) .......................... 10-2016-0015908

(51) Int. Cl.
*H04L 29/06*    (2006.01)
*H04L 9/32*    (2006.01)
(Continued)

(52) U.S. Cl.
CPC ............ *H04L 63/123* (2013.01); *G06F 21/54* (2013.01); *G06F 21/64* (2013.01); *H04L 9/3239* (2013.01)

(58) Field of Classification Search
USPC ....................................................... 713/165
See application file for complete search history.

(56) References Cited

U.S. PATENT DOCUMENTS

| 5,657,470 A * | 8/1997 | Fisherman | .............. | G06F 21/80 |
| | | | | 711/100 |
| 7,392,541 B2 * | 6/2008 | Largman | ................ | G06F 21/53 |
| | | | | 726/17 |

(Continued)

FOREIGN PATENT DOCUMENTS

| KR | 101082917 B1 | 11/2011 |
| KR | 20150035249 A | 4/2015 |

OTHER PUBLICATIONS

Korean Office Action dated Apr. 3, 2017 for corresponding Korean Patent Application No. 10-2016-0015908.

*Primary Examiner* — Amare F Tabor
(74) *Attorney, Agent, or Firm* — Harness, Dickey & Pierce, P.L.C.

(57) ABSTRACT

A file protection method may include receiving a package that includes files for installing and executing an application, adding a protection file for an operation of a file protection module to the package, and providing the package to which the protection file is added over a network. In response to execution of a control command for a desired file that is controlled by the application through a service code of the application at an electronic device on which the application is installed and executed through the package, a protection command included in the file protection module is called and control of the desired file and integrity verification associated with data stored in the desired file are processed in response to the called protection command.

15 Claims, 9 Drawing Sheets

(51) Int. Cl.
*G06F 21/54* (2013.01)
*G06F 21/64* (2013.01)

(56) References Cited

U.S. PATENT DOCUMENTS

| | | | | |
|---|---|---|---|---|
| 7,814,554 B1* | 10/2010 | Ragner | ............... | G06F 21/52 |
| | | | | 713/165 |
| 8,429,410 B2* | 4/2013 | Little | ............... | G06F 21/62 |
| | | | | 713/175 |
| 8,813,246 B2* | 8/2014 | Hierro | ............... | G06F 21/10 |
| | | | | 713/165 |
| 10,033,702 B2* | 7/2018 | Ford | ............... | H04L 63/0421 |
| 2008/0104711 A1* | 5/2008 | Johns | ............... | G06F 12/145 |
| | | | | 726/27 |
| 2008/0244743 A1* | 10/2008 | Largman | ............... | G06F 21/53 |
| | | | | 726/23 |
| 2010/0005531 A1* | 1/2010 | Largman | ............... | G06F 21/53 |
| | | | | 726/24 |
| 2010/0275029 A1* | 10/2010 | Little | ............... | G06F 21/62 |
| | | | | 713/176 |

* cited by examiner

METHOD, APPARATUS, SYSTEM, AND NON-TRANSITORY MEDIUM FOR PROTECTING A FILE

CROSS-REFERENCE TO RELATED APPLICATION(S)

This U.S. non-provisional application claims the benefit of priority under 35 U.S.C. § 119 to Korean Patent Application No. 10-2016-0015908 filed on Feb. 11, 2016, in the Korean Intellectual Property Office (KIPO), the entire contents of which are incorporated herein by reference.

BACKGROUND

Field

One or more example embodiments relate to a method, apparatus, system and/or non-transitory computer readable medium for protecting a file.

Description of Related Art

In a server-client environment, a client may connect to a server through a specific application, such as a client program, and may use a service provided by the server. Here, important data files associated with the service may be stored in the server for data integrity verification associated with important data and/or protection of the important data from manipulation thereof.

For example, some conventional systems provide integrity verification of user data, a configuration of verifying integrity of user data of which download is requested by storing a cryptogram of user data and a bloom filter associated with the user data in a storage device of a server that provides a remote computing service, by calling a portion of the cryptogram corresponding to the requested user data and a portion of the bloom filter from the storage and transmitting the portion of the cryptogram and the portion of the bloom filter to the user in response to a request for downloading the user data from the user, and by determining whether the transmitted portion of the cryptogram belongs to the transmitted portion of the bloom filter.

However, in some services, such as a game service that supports an offline mode, important (e.g., critical) data files are stored in a client and are continuously updated. With respect to such services in which important data files are stored in a client, it is very ineffective to verify the integrity of the important data through continuous communication with and/or connection to a server. In addition, since a user may easily access the important data file stored in the client, the client may not readily prevent unauthorized manipulation of the corresponding file.

SUMMARY

One or more example embodiments provide a file protection method and system that may protect an important file by adding a file protection module to files of an application registered to a server by transmitting the file protection module to an electronic device. Additionally, the method may include calling an open command, a read command, and/or a write command of the file protection module in response to execution of the open command, the read command, and/or the write command for a specific file through a service code of the application executed on the electronic device. The method may further include opening, reading, and/or writing the specific file in response to the open command, the read command, and/or the write command of the file protection module and at the same time, verifying integrity for the specific file.

According to an aspect of at least one example embodiment, there is provided a file protection method of a server, the method including receiving, using at least one processor, a package that includes files for installing and executing an application, adding, using the at least one processor, a protection file for an operation of a file protection module to the package, transmitting, using the at least one processor, the package to which the protection file is added over a network, wherein, in response to execution of a control command for at least one desired file that is controlled by the application through service code of the application at an electronic device on which the application is installed and executed, a protection command included in the file protection module is called and control of the desired file and integrity verification associated with data stored in the desired file are processed in response to the called protection command.

According to another aspect of at least one example embodiment, there is provided a non-transitory computer-readable medium storing computer readable instructions, which when executed by at least one processor of an electronic device, causes the at least one processor to implement a file protection method, the file protection method comprising executing an application installed on the electronic device, transmitting a service based on service code of the application, calling a protection command for at least one desired file included in a file protection module that is included in the application, in response to execution of a control command for the desired file that is controlled by the application, and processing control of the desired file and integrity verification associated with data stored in the desired file.

According to another aspect of at least one example embodiment, there is provided a file protection method of an electronic device, the method including executing, using at least one processor, an application installed on the electronic device, providing, using the at least one processor, a service based on a service code of the application, calling, using the at least one processor, a protection command for a desired file included in a file protection module that is included in the application, in response to execution of a control command for a desired file that is controlled by the application, and processing, using the at least one processor, control of the desired file and integrity verification associated with data stored in the desired file in response to the called protection command.

According to some example embodiments, it is possible to protect an important file by adding a file protection module to files of an application registered to a server and transmitting the file protection module to an electronic device. When the important file is called using an open command, a read command, and/or a write command, an open command, the read command, and/or the write command of the file protection module is called in response through service code of the application executed on the electronic device, and the integrity of the specific file is verified.

Also, according to some example embodiments, a developer of an application may concentrate on developing a service of the application since there is no need to add a separate protection code to the application or to add a separate function for protecting integrity at a server in order to protect integrity of a file.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
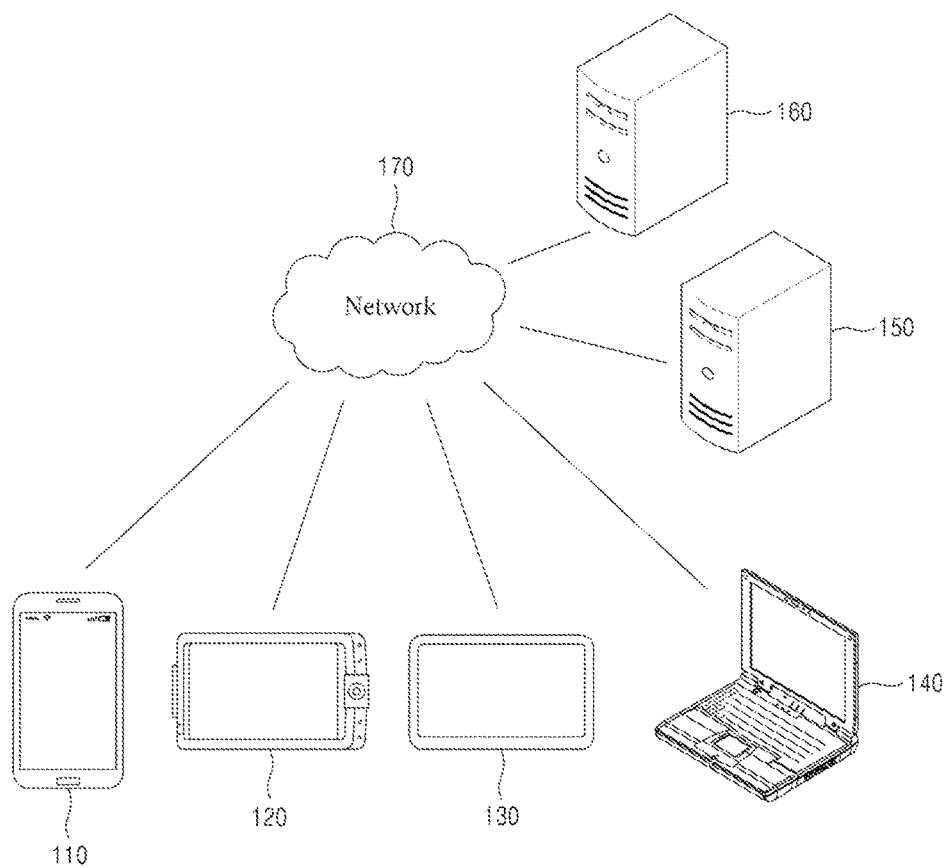
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170, but is not limited thereto. FIG. 1 is provided as an example only and thus, the number of electronic devices and/or the number of servers may be greater or less than the amount shown in FIG. 1.

Each of the plurality of electronic devices 110, 120, 130, and 140 may be a fixed terminal, or a mobile terminal, configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a gaming console, an Internet of Things (IoT) device, a virtual reality device, an augmented reality device, a smart device, and the like. For example, the electronic device 110 may communicate with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, the network 170 is only an example and the example embodiments are not limited thereto.

Each of the servers 150 and 160 may be configured as a computer apparatus, or a plurality of computer apparatuses, that provides instructions, codes, files, contents, services, and the like through communication with the plurality of electronic devices 110, 120, 130, and/or 140 over the network 170.

For example, the server 150 may add a file for a file protection module to an application registered from the electronic device 120. The application that includes the file protection module may be provided to the electronic device 110 through the server 150 and/or the separate server 160, and the electronic device 110 may use a service provided by the application by installing and executing the application. An important data file stored in the electronic device 110 may be protected through the file protection module.

Figure 2:
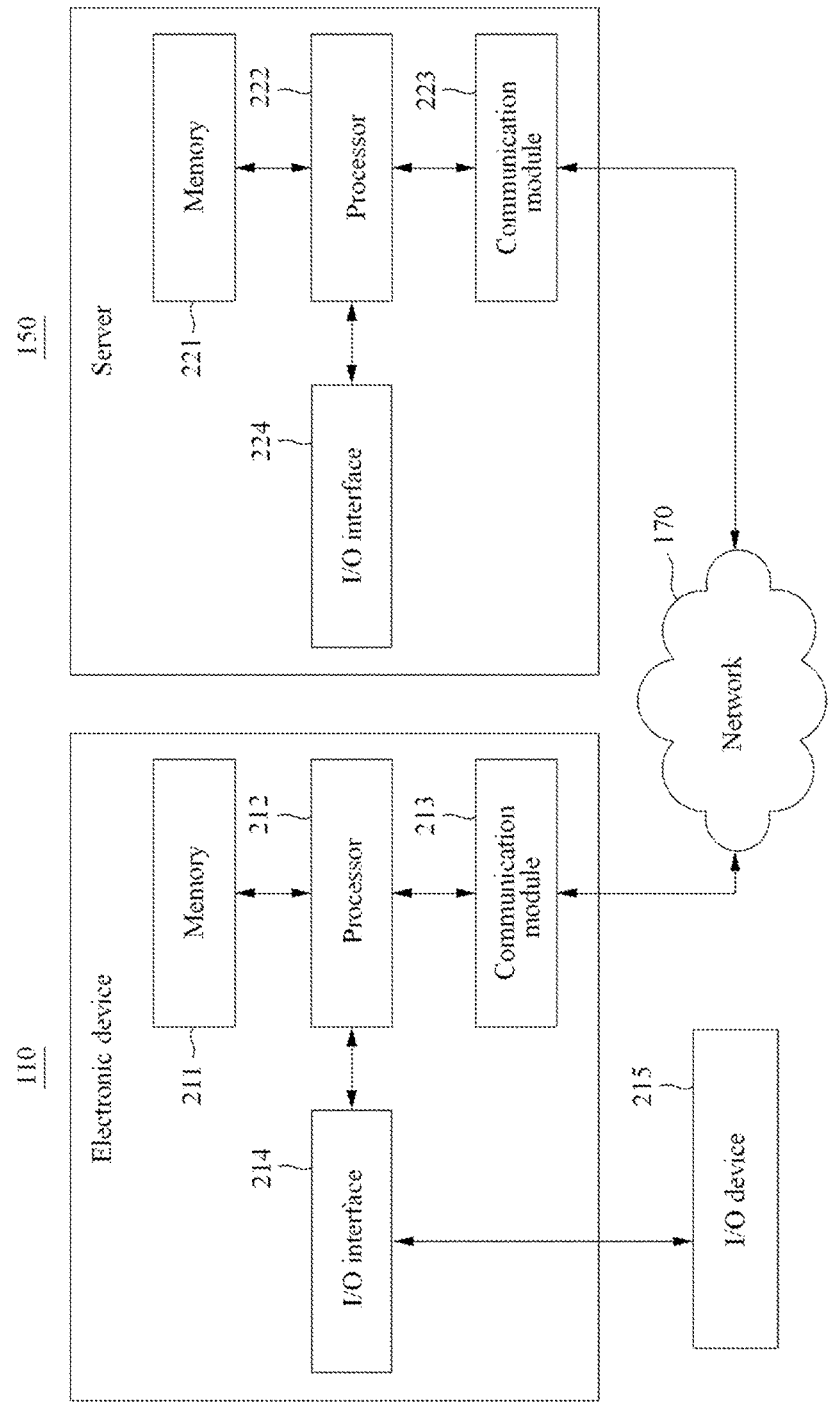
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server, but the example embodiments are not limited thereto and the electronic device and/or the server may be a plurality of electronic devices and/or a plurality of servers, respectively. The same or similar constituent elements may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, etc., and the server 150 may include a memory 221, at least one processor 222, a communication module 223, and an I/O interface 224, etc. The memory 211, 221 may include a permanent mass storage device, such as random access memory (RAM), read only memory (ROM), a disk drive, a solid state drive, an optical disk drive, etc., as a non-transitory computer-readable storage medium. Also, an OS and at least one program code, for example, a code for an application for video call, a browser, etc., installed and executed on the electronic device 110, may be stored in the memory 211, 221. Such software constituent elements may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM/Bluray drive, a memory card, etc. According to other example embodiments, software constituent elements may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. Additionally, the processor 212 of the electronic device 110 may transfer a request, for example, a request for a video call service, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 and/or the memory 211, and content, a file, etc., may be stored in a storage medium further includable in the electronic device 110.

The I/O interface 214, 224 may be an interface for at least one I/O device 215. For example, an input device may include a keyboard, a mouse, a stylus, a touchpad, a microphone, a camera, etc., and an output device may include a device, such as a display for displaying a communication session of an application, a speaker, a haptic feedback device, etc. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 and/or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and the like. In detail, if the electronic device 110 is a smartphone, the electronic device 110 may be configured to further include a variety of constituent elements, for example, an accelerometer sensor, a gyroscope sensor, a camera, various physical buttons, a button using a touch panel, an I/O port, a motor for vibration, etc., which are generally included in the smartphone.

Figure 3:
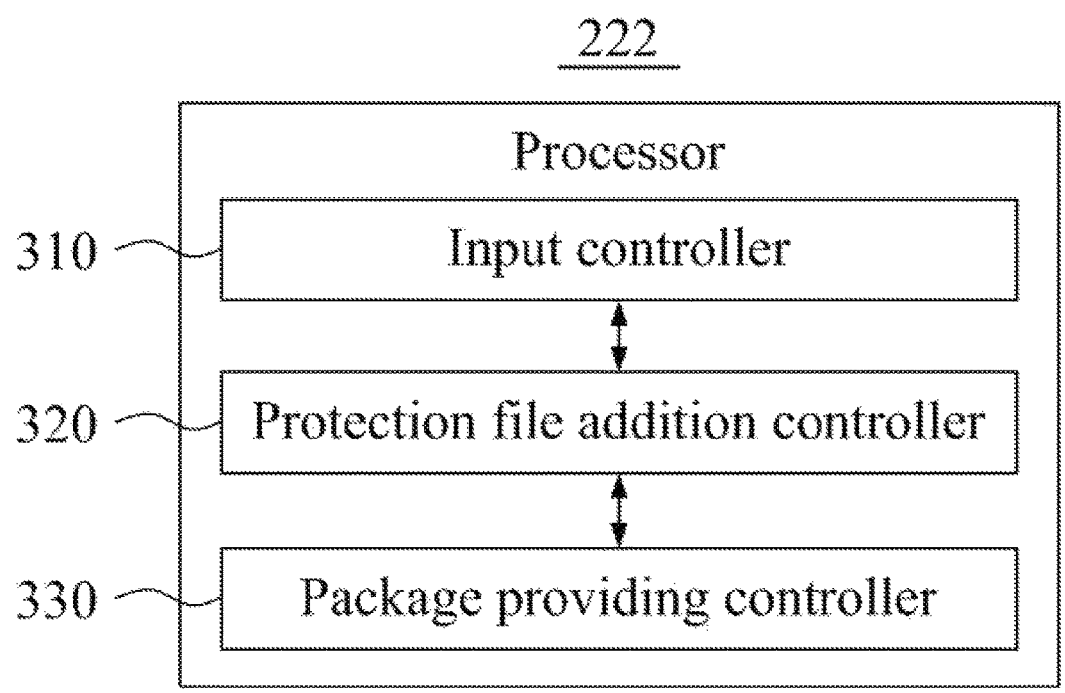
FIG. 3 is a diagram illustrating an example of constituent elements included in at least one processor of a server according to at least one example embodiment.
Figure 4:
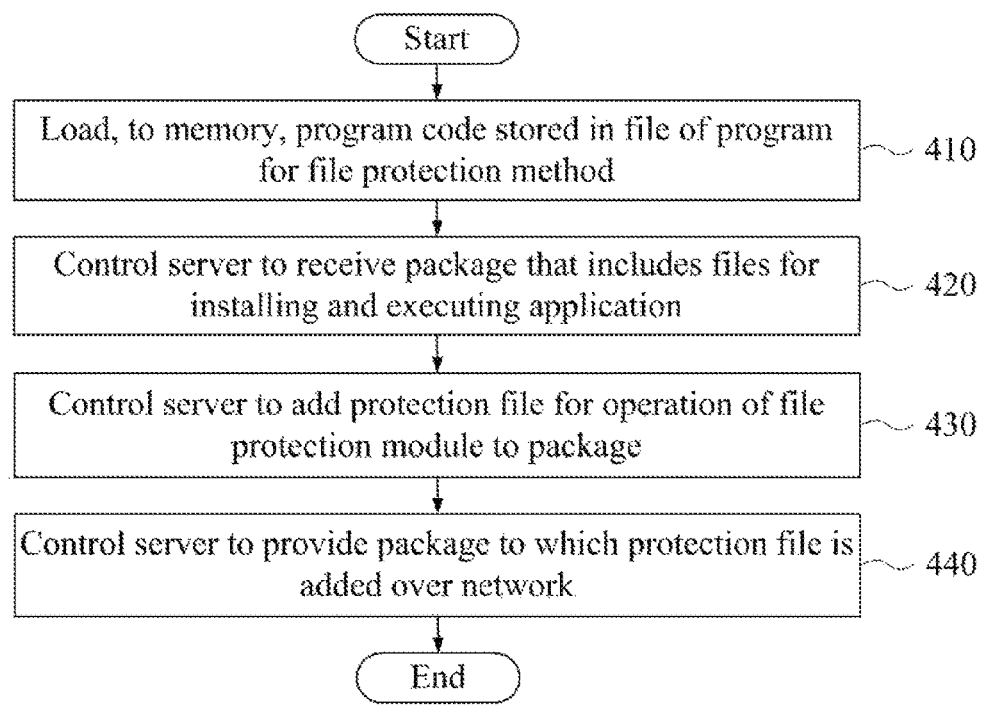
FIG. 4 is a flowchart illustrating an example of a method performed at a server according to at least one example embodiment.

FIG. 3 is a diagram illustrating an example of constituent elements included in at least one processor of a server according to at least one example embodiment, and FIG. 4 is a flowchart illustrating an example of a method performed at a server according to at least one example embodiment.

Referring to FIG. 3, the at least one processor 222 of the server 150 may include an input controller 310, a protection file addition controller 320, and a package providing controller 330, etc., as constituent elements, but is not limited thereto. The processor 222 and the constituent elements of the processor 222 may control the server 150 to perform operations 410 through 440 included in the file protection method of FIG. 4. Here, the processor 222 and the constituent elements of the processor 222 may be configured to execute computer readable instructions according to a code of at least one program and a code of an OS included in the memory 221. Also, the constituent elements of the processor 222 may be representations of different functions performed at the processor 222 in response to a control command provided from the program code stored in the server 150. For example, the processor 222 may use the input controller 310 as a functional representation that operates to receive a package in response to the control command.

In operation 410, the processor 222 may load, to the memory 221, a program code stored in a file of a program for the file protection method. For example, in response to execution of the program at the server 150, the processor 222 may control the server 150 to load the program code from the file of the program to the memory 221 under the control of the OS.

Here, the input controller 310, the protection file addition controller 320, and the package providing controller 330 included in the processor 222 may be different functional representations of the processor 222 to perform operations 420 through 440, respectively, by executing a command of a portion corresponding to the program code loaded to the memory 221.

In operation 420, the input controller 310 may control the server 150 to receive a package that includes files for installing and executing an application. For example, a developer of the application may connect to the server 150 over the network 170 using the electronic device 120, and may upload the package to the server 150. Here, the input controller 310 may control the server 150 to pass through a process of receiving, storing, and registering the package. As another example, the developer of the application may provide a separate non-transitory storage medium in which the package is stored, so that the package may be input to the server 150 through the non-transitory storage medium.

In operation 430, the protection file addition controller 320 may control the server 150 to add a protection file for and/or related to an operation of a file protection module to the package. For example, the file protection module may be added to the package of the application to provide a protection function for at least one specific file among a plurality of files controlled by the application installed and executed on the electronic device 110. The protection function for the specific file will be further described.

In operation 440, the package providing controller 330 may control the server 150 to provide the package to which the protection file is added over the network 170. The package to which the protection file is added may be provided, immediately or at a desired time, from the server 150 to the electronic device 110, and/or may be provided to the electronic device 110 through another server, for example, the server 160. For example, the server 160 may be a system that registers and manages a plurality of applications and distributes the plurality of applications to a plurality of users. In this case, the server 150 may transmit to the server 160 and register the package to which the protection file is added through the developer and/or directly as a system for providing the file protection module for applications.

Hereinafter, the file protection method will be described from perspective of the electronic device 110 that receives the package with reference to FIGS. 5 and 6.

Figure 5:
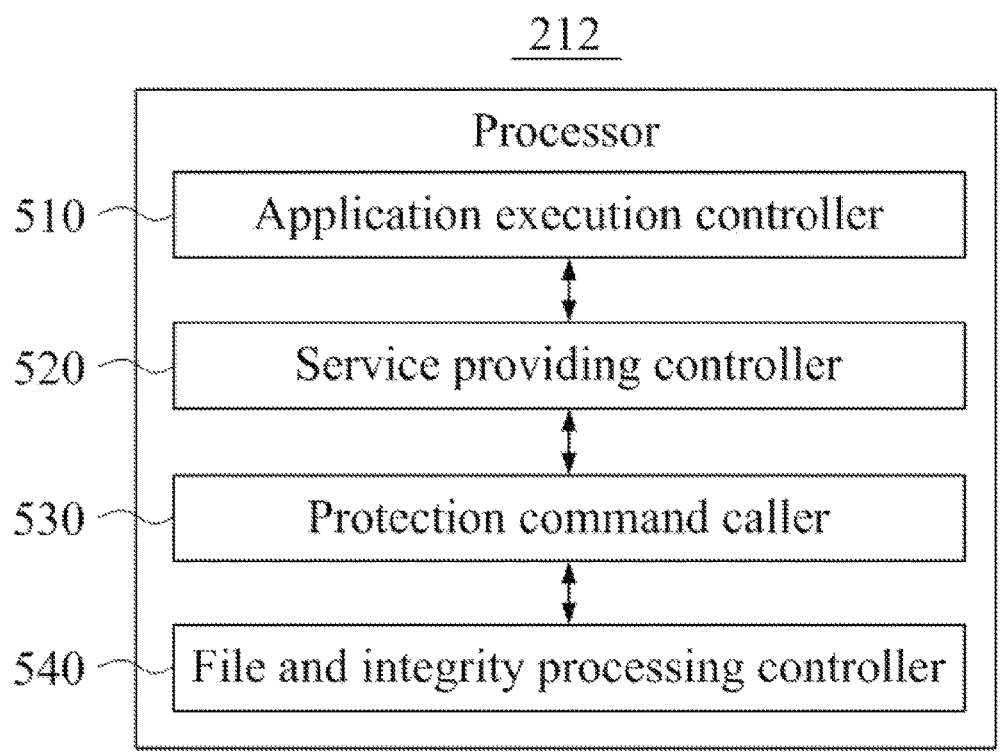
FIG. 5 is a diagram illustrating an example of constituent elements included in at least one processor of an electronic device according to at least one example embodiment.
Figure 6:
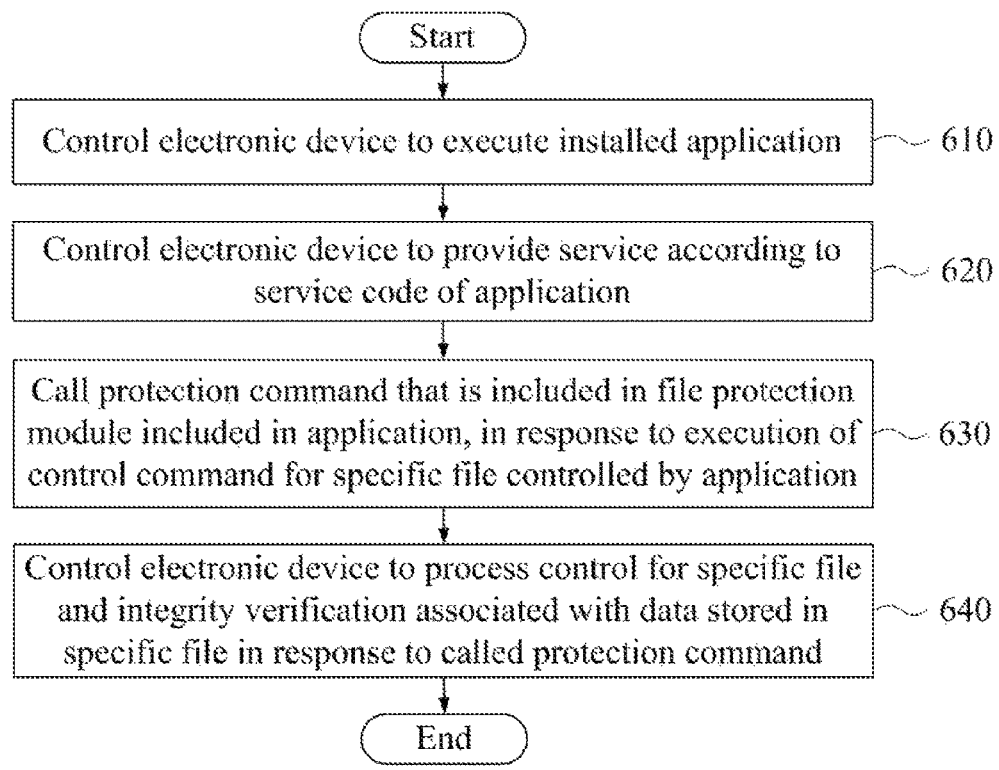
FIG. 6 is a flowchart illustrating an example of a method performed at an electronic device according to at least one example embodiment.

FIG. 5 is a diagram illustrating an example of constituent elements included in at least one processor of an electronic device according to at least one example embodiment, and FIG. 6 is a flowchart illustrating an example of a method performed at an electronic device according to at least one example embodiment.

Referring to FIG. 5, the processor 212 of the electronic device may include an application execution controller 510, a service providing controller 520, a protection command caller 530, and a file and integrity processing controller 540 as constituent elements, but is not limited thereto. Here, the processor 212 and the constituent elements of the processor 212 may be configured to execute computer readable instructions according to a code of at least one program and a code of an OS included in the memory 211, for example, a package of an application that includes a protection file including a file protection module received from the server 150. Also, the constituent elements of the processor 212 may be representations of different functions performed at the processor 212 in response to a control command received from the program code stored in the electronic device 110. For example, the processor 212 may use the application execution controller 510 as a functional representation that operates to execute the application in response to the control command.

In operation 610, the application execution controller 510 may control the electronic device 110 to execute the installed application. For example, in response to execution of the application on the electronic device 110, the application execution controller 510 may control the electronic device 110 to load program code from files of the application to the memory 211 under control of the OS.

In operation 620, the service providing controller 520 may control the electronic device 110 to provide a service according to service code of the application. For example, in the case of a game application, the service providing controller 520 may control the electronic device 110 to provide a game service of an online mode or an offline mode. Here, in the online mode, the service providing controller 520 may connect to a game server (not shown) over the network 170 and receive data related to the game service. Other examples of a service include a messenger application, an office software suite, a work collaboration application, a video streaming application, a music streaming application, a Software as a Service (SAAS) application, and/or other software that provides online and offline modes and/or requires constant connection to a server for authentication purposes.

In operation 630, in response to execution of a control command for a specific file controlled by the application, the protection command caller 530 may call a protection command that is included in the file protection module included in the application. Files, for example, data files, instructions files, command files, etc., stored in the electronic device 110 and controlled in response to a control command for at least one file of the service application code, are controlled by the application and may be manipulated by a user of the electronic device 110 via a graphical user interface (GUI) or other user interface. Thus, there is a need to provide a protection function, such as file integrity monitoring and/or file manipulation detection of data stored in the corresponding files related to the service application. According to at least one example embodiment, it is possible to call the protection command included in the file protection module to reduce and/or prevent the user from directly controlling a file through the control command of the service code for the specific file that is designated for protection by the file protection module.

In operation 640, the file and integrity processing controller 540 may control the electronic device 110 to process control for one or more specific and/or desired files and integrity verification associated with data stored in the one or more specific and/or desired files in response to the called protection command. For example, the file protection module may store integrity code for the specific (e.g., desired and/or specified) file, and the protection command may be used to protect against manipulation (e.g., copying, modifying, overwriting, replacing, deleting, etc.) of the file by processing control for the file, and by processing integrity verification associated with the data stored in the file through a process of creating integrity code for the file and comparing the created integrity code to the stored integrity code, etc. For example, if the created integrity code differs from the stored integrity code, the file and integrity processing controller 540 may control the electronic device 110 to transmit a message indicating the manipulation of the specific file to the server 150, impair the performance of the application and/or to prevent execution of the application on the electronic device 110.

As an example for processing a call of the protection command, a software development kit (SDK) scheme may be employed according to at least one example embodiment. An SDK for file protection may be provided to a software developer of the application, information technology (IT) professionals, computer security specialists, etc., but is not limited thereto. The developer, for example, may include, in the service code of the application through the SDK (e.g., through a call to the SDK, incorporation of the SDK into the service code of the application, etc.), a command for calling the protection command included in the file protection module as a control command for the specific file. In this case, when the service is provided based on the service code in operation 620, the control command for the specific file included in the service code may be replaced (e.g., substituted) with the command for calling the protection command included in the file protection module. Accordingly, the protection command included in the file protection module is automatically called instead of the control command for the specific file. If the user of the electronic device 110 removes the protection file that includes a file protection command, the protection command may not be called and the application may be configured to not operate normally.

When the protection command is normally called, the file and integrity processing controller 540 may process the control for the specific file in response to the protection command and may verify the integrity of the specific file through the comparison and update of an integrity code, for example a hash value, a digital fingerprint, etc., of the specific file, stored in association with the specific file.

For example, the control command for the specific file may include at least one of an open command, a read command, and a write command for the specific file. In this case, the file and integrity processing controller 540 may verify the integrity of the specific file by opening or reading the specific file through the protection command called in response to the open command or the read command, creating a hash value of the opened or read specific file, and then comparing the created hash value to a hash value stored by the file protection module containing an expected hash value of the specific file. The specific file may not be modified during the opening or reading of the file, and thus the hash value newly created for the file needs to be the same as the previously stored hash value. If the created hash value differs from the previously stored hash value, the probability that the specific file has been manipulated is high. Thus, the electronic device 110 may protect the file of the application by transmitting a message indicating the manipulation of the specific file to the server 150, impair the performance of the application, and/or by proceeding with a procedure of stopping the execution of the application under the control of the file protection module.

Also, the file and integrity processing controller 540 may process a called write command for the specific file through the protection command called in response to the write command and may create a hash value of the written specific file. Additionally, the file and integrity processing controller 540 may update the stored hash value with the created hash value. Once writing of the specific file is processed, the file may be modified. Thus, the hash value stored for comparison may be replaced with the hash value of the modified specific file following an authorized write operation (e.g., write, overwrite, etc.) of the specific file. The file and integrity processing controller 540 may write the specific file (and/or write to the specific file) through the protection command called in response to the write command and may update the hash value.

As another example, the protection command may be called in response to the control command without providing a separate SDK. For example, the file protection module may verify whether the control command for the specific file is executed through a call stack and/or a register. For example, in operation 630, the protection command caller 530 may call the protection command by verifying whether the control command for the specific file is executed through the call stack and/or the register, and by regarding (e.g., interpreting, etc.) execution of the control command as a call of the protection command. Information associated with an address used to call a function, an address to provide a return value, etc., in association with the function executed at the service code may be managed through the call stack and/or the register. The protection command caller 530 may verify the call stack and/or the register under control of the file protection module and may verify an occurrence of the open command, the read command, and/or the write command for the specific file. According to at least one example embodiment, the protection command caller 530 may call and execute the protection command instead of the control command by regarding the verified open command, read command, and/or write command as the call of the protection command, for example, by hooking (and/or replacing, substituting, etc.) the control command verified through the call stack and/or the register.

According to some example embodiments, the control command for the specific file may be executed through a separate library file associated with a service code. For example, the separate library file may be a file provided from a third party, not the developer of the application or the server. Accordingly, the separate library file may not be controlled by the developer through an SDK. Here, the protection command caller 530 may call the protection command by regarding (e.g., interpreting, etc.) the control command of the specific file through the library file as the call of the protection command under control of the file protection module, for example, by hooking (and/or replacing, substituting, etc.) the control command through the library file. For example, the protection command caller 530 may regard some or all of the open command, the read command, and/or the write command for the specific file through the library file as a call of the protection command and thereby execute the protection command instead of the open command, the read command, and/or the write command for the specific file.

According to some example embodiments, it is possible to protect an important file by adding a file protection module to files of an application registered to a server by transmitting the file protection module to an electronic device, calling an open command, a read command, and/or a write command of the file protection module in response to the execution of the open command, the read command, and/or the write command for a specific file (e.g., the desired important file) through service code of the application executed on the electronic device, and by opening, reading, and/or writing the specific file in response to the open command, the read command, and/or the write command of the file protection module and, at the same time, verifying the integrity of the specific file (e.g., determining if the specific file has been modified and/or manipulated). Also, according to some example embodiments, a developer of an application may concentrate on developing a service of the application since there is no need to add a separate protection code to the application or to add a separate function for protecting integrity at a server in order to protect integrity of a file.

Hereinafter, some example embodiments of a file protection method will be further described.

Figure 7:
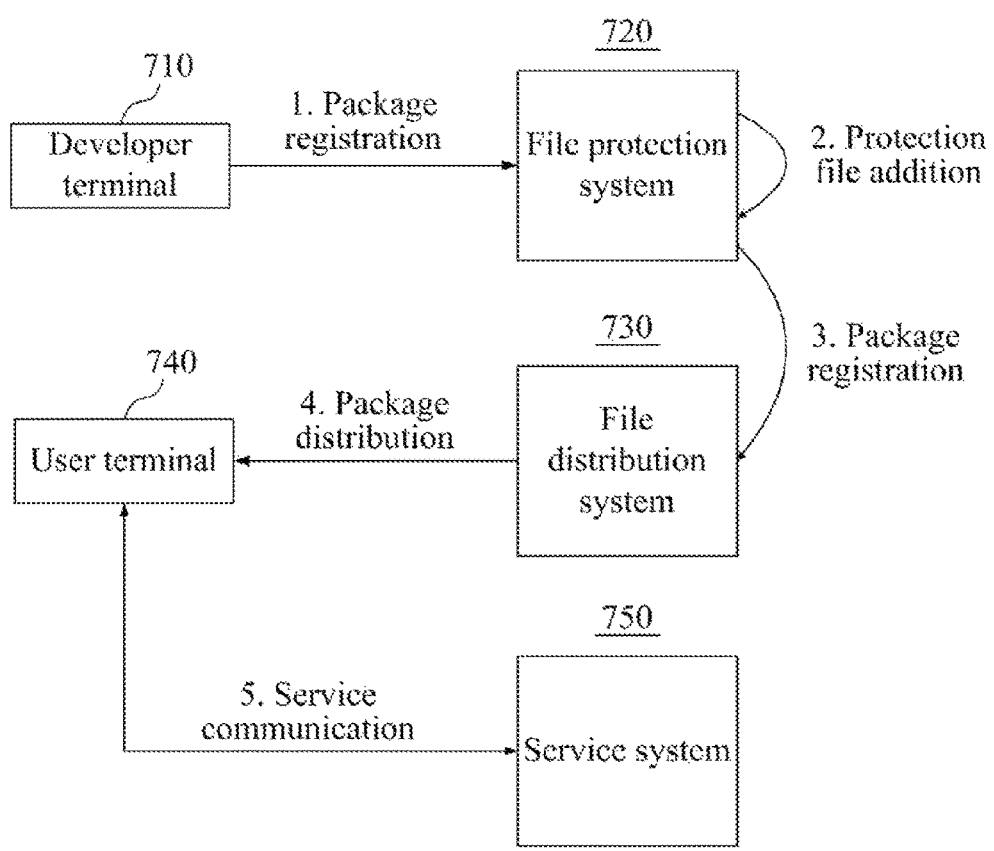
FIG. 7 is a diagram illustrating an example of a process of a server that adds a protection file to a package and transmits the package to an electronic device according to at least one example embodiment.

FIG. 7 is a diagram illustrating an example of a process of a server that adds a protection file to a package and transmits the package to an electronic device according to at least one example embodiment. FIG. 7 illustrates a developer terminal 710, a file protection system 720, a file distribution system 730, a user terminal 740, and a service system 750, but the example embodiments are not limited thereto. The developer terminal 710 may be an electronic device used by a developer of an application. The user terminal 740 may be an electronic device used by a user of an application. The file protection system 720 may correspond to the server 150, and the file distribution system 730 and the service system 750 may be individual servers, but are not limited thereto. According to other example embodiments, the file protection system 720 and the file distribution system 730 may be systems that are operated by the same entity or may be a single system. Also, the service system 750 may be a server system that is operated by the developer and/or may be a server system that operates based on a service-side program provided from a third party different from the developer. For example, the service system 750 may be a game server that provides an online game service through a game application, a server that provides a messenger service through a messenger application, a server that provides an office software service through an office software application, a work collaboration server that provides service through a work collaboration application, a video server that provides service to a video streaming application, a music server that provides service to a music streaming application, a SAAS server providing service to a SAAS application, and/or other software that provides online and offline modes and/or requires constant connection to a server for authentication purposes.

1. A package registration process may be a process in which the developer terminal 710 registers a package of an application developed by the developer to the file protection system 720. For example, the package may be transmitted from the developer terminal 710 to the file protection system 720 through data communication over a network, for example, the network 170 of FIG. 1, between the developer terminal 710 and the file protection system 720. Description related to data communication over the network is omitted.

2. A protection file addition process may be a process in which the file protection system 720 adds a protection file included in a file protection module to the registered package of the application.

3. A package registration process may be a process in which the file protection system 720 registers, to the file distribution system 730, the package to which the protection file is added. According to other example embodiments, the file protection system 720 may provide, to the developer terminal 710, a protection file to be added to the package, and the developer terminal 710 may directly register, to the file distribution system 730, the package to which the protection file has been added.

4. A package distribution process may be a process in which the file distribution system 730 distributes, to the user terminal 740, the package to which the protection file is added in response to a request from the user terminal 740. The application may be installed on the user terminal 740 through the package to which the protection file is added.

5. A service communication process may be a process in which the user terminal 740 uses a service through communication with the service system 750 based on the executed application.

Figure 8:
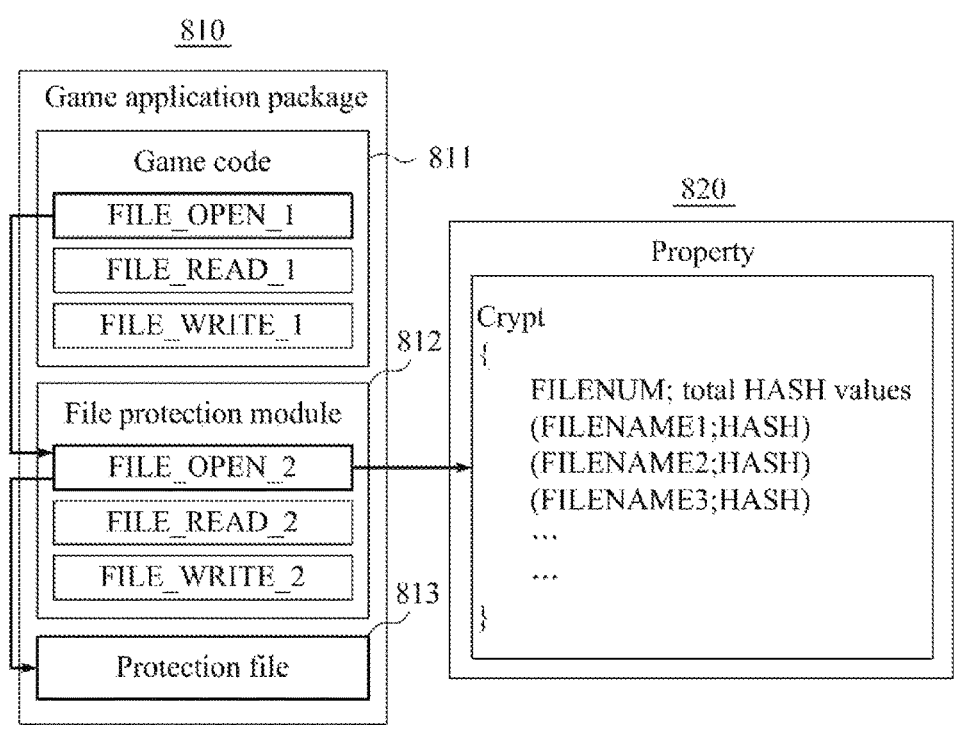
FIG. 8 is a diagram illustrating an example of a method of protecting a file based on a software development kit (SDK) scheme according to at least one example embodiment.

FIG. 8 is a diagram illustrating an example of a method of protecting a file based on an SDK scheme according to at least one example embodiment. FIG. 8 illustrates an example of a game application package 810, and the game application package 810 includes a game code 811, a file protection module 812, and a protection file 813, but is not limited thereto. FIG. 8 illustrates an example of automatically calling protection command "FILE_OPEN_2" of the file protection module 812 in response to the execution of an open command "FILE_OPEN_1" for opening the protection file 813 through a game code (e.g., code related to a game application), but the example embodiments are not limited thereto. As described above, control commands, for example, FILE_OPEN_1, FILE_READ_1, and/or FILE_WRITE_1, with respect to the protection file 813 of the game code, may be configured to call protection commands, for example, FILE_OPEN_2, FILE_READ_2, and FILE_WRITE_2, of the file protection module 812 based on an SDK provided to a developer. In response to the called protection command "FILE_OPEN_2", the open command for the protection file 813 may be processed and a hash value or other integrity code of the protection file 813 may be created. The created hash value (e.g., integrity code) may be compared to a hash value that is encrypted and stored in a specific storage area, for example, "Property" 820 managed by the file protection module 812, and may be used to verify the integrity of data stored in the protection file 813.

Likewise, even in response to execution of read command "FILE_READ_1" or write command "FILE_WRITE_1" for the protection file 813 through the game code, the protection command "FILE_READ_2" or "FILE_WRITE_2" of the file protection module 812 may be automatically called. If the protection file 813 is modified in response to the protection command "FILE_WRITE_2", the hash value encrypted and stored in the "Property" 820 is updated and/or replaced with a hash value created for the modified protection file 813.

The example embodiment of FIG. 8 is described based on a single protection file 813. However, a plurality of files may be set as protection files and all of the files to be controlled through the game code may be set as protection files. A hash value (e.g., integrity code) may be created and managed for each of the individual files, or a single hash value (e.g., integrity code) may be created and managed for two or more of the individual files. Also, the specific storage area, for example, "Property" 820, may be an area included in the file protection module 812, or may be a separate area on a memory device, for example, the memory 211 of the electronic device 110 of FIG. 2.

Figure 9:
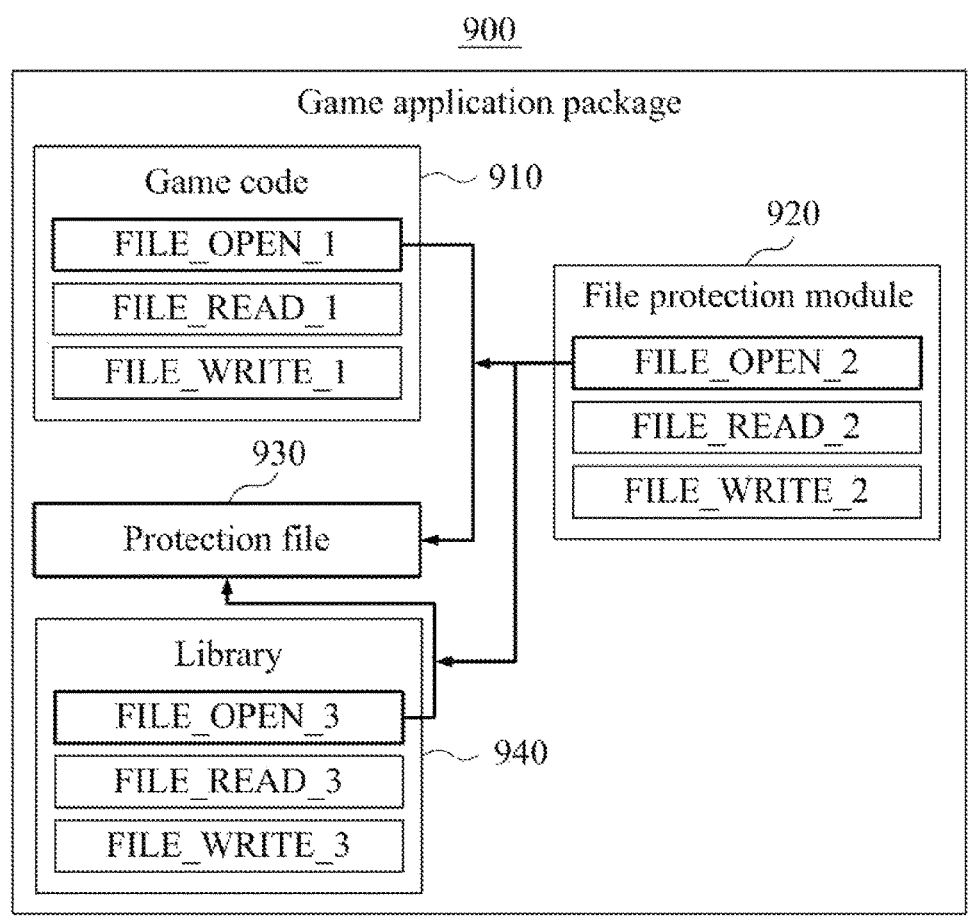
FIG. 9 is a diagram illustrating an example of a method of protecting a file in a hooking mode according to at least one example embodiment.

FIG. 9 is a diagram illustrating an example of a method of protecting a file in a hooking mode according to at least one example embodiment. FIG. 9 illustrates an example of a game application package 900, and the game application package 900 includes a game code 910, a file protection module 920, and a protection file 930, but is not limited thereto. Here, a separate SDK is not provided. Accordingly, open command "FILE_OPEN_1" of the game code 910 may be used to open the protection file 930. Here, the file protection module 920 may call protection command "FILE_OPEN_2" of the file protection module 920 by hooking the open command "FILE_OPEN_1" of the game code 910, or in other words causing the call protection command "FILE_OPEN_2" of the file protection module 920 to be called when the open command "FILE_OPEN_1" of the game code 910 is called. In this case, the protection command "FILE_OPEN_2" of the file protection module 920 may be used to verify the integrity of the data stored in the protection file 930 by opening the protection file 930, creating a hash value of the protection file 930, and by comparing the created hash value to a pre-stored hash value.

Likewise, the file protection module 920 may call protection command "FILE_READ_2" or "FILE_WRITE_2" of the file protection module 920 by hooking open command "FILE_READ_1" or write command "FILE_WRITE_1" of the game code 910. In each case, the reading and writing of the protection file 930 may be processed and a comparison and/or update of a hash value or integrity code may be performed. As described above, the hooking of a command may be processed by verifying whether a control command, for example, open, read, and/or write, for the protection file 930 is executed through a call stack and/or a register.

In addition, open command "FILE_OPEN_3", read command "FILE_READ_3", and/or write command "FILE_WRITE_3" for the protection file 930 may occur even in a library 940, not in the game code 910. The file protection module 920 may process opening, reading, and/or writing of the protection file 930 by hooking the command in the library 940 and by calling protection commands of the file protection module 920. Integrity verification through comparison and update of a hash value (e.g., integrity code) may be processed at the file protection module 920. Here, hooking of a command may be processed by hooking some or all of the open, read, and/or write commands for the protection file 930 that occur (e.g., are present) in the library 940.

The units and modules described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM, DVD, and Bluray disks; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A file protection method of a server, the method comprising:
   receiving, using at least one processor, a package that includes files for installing and executing an application;
   adding, using the at least one processor, a protection file for an operation of a file protection module to the package; and
   transmitting, using the at least one processor, the package to which the protection file is added over a network, wherein,
      in response to execution of a control command for at least one desired file that is controlled by the application through service code of the application at an electronic device on which the application is installed and executed,
         a protection command included in the file protection module is called, and
         control of the desired file and integrity verification associated with data stored in the desired file are processed in response to the called protection command;
      the control command for the desired file includes at least one of an open command, a read command, and a write command for the desired file;
      the calling the protection command further includes, when the protection command is called in response to the open command or the read command,
         verifying the integrity of the desired file by opening or reading the desired file,
         creating a hash value of the opened or read desired file, and
         comparing the created hash value to a hash value previously stored by the file protection module; and
      the calling the protection command further includes, when the protection command is called in response to the write command,
         processing the write command for the desired file, creating a hash value of the written desired file, and updating the stored hash value with the created hash value.

2. The method of claim 1, wherein the control command for the desired file is included in the service code of the application, the control command including a call to the protection command included in the file protection module provided through a software development kit (SDK).

3. The method of claim 1, further comprising:
   calling, using the at least one processor, the protection command in response to execution of the control command for the desired file;
   processing, using the at least one processor, control of the desired file; and
   verifying, using the at least one processor, the integrity of the desired file based on a hash value associated with the desired file stored.

4. The method of claim 1, further comprising:
   verifying, using the at least one processor, whether the control command for the desired file is executed through a call stack or a register using the file protection module; and
   in response to execution of the control command as the call of the protection command,
      calling the protection command,
      controlling the desired file, and
      processing the integrity verification associated with data stored in the desired file.

5. The method of claim 1, wherein
   the control command is a library file included in the application as a call of the protection command; and
   in response to the execution of the control command for the desired file,
      the protection command is called,
      the desired file is controlled, and
      the integrity verification associated with data stored in the desired file is processed.

6. A non-transitory computer-readable medium storing computer readable instructions, which when executed by at least one processor of an electronic device, causes the at least one processor to implement a file protection method, the file protection method comprising:
   executing an application installed on the electronic device;
   transmitting a service based on service code of the application;
   calling a protection command for at least one desired file included in a file protection module that is included in the application, in response to execution of a control command for the desired file that is controlled by the application; and
   processing control of the desired file and integrity verification associated with data stored in the desired file; wherein
   the control command for the desired file includes at least one of an open command, a read command, and a write command for the desired file; and
   when the control command called is the open command or the read command, the processing control of the desired file comprises verifying the integrity of the desired file by opening or reading the desired file,
      creating a hash value of the opened or read desired file, and
      comparing the created hash value to a previously stored hash value; and
   when the control command called is the write command, the processing control of the desired file comprises:
      creating a hash value of the written desired file, and updating the stored hash value with the created hash value.

7. The non-transitory computer-readable medium of claim 6, wherein the control command for the desired file is included in the service code of the application to call the protection command through a software development kit (SDK).

8. The non-transitory computer-readable medium of claim 6, wherein the processing control of the desired file comprises processing the control of the desired file and verifying the integrity of the desired file through comparison of a hash value stored in association with the desired file.

9. The non-transitory computer-readable medium of claim 6, wherein the calling the protection command comprises:
verifying whether the control command for the desired file is executed through a call stack or a register, under control of the file protection module; and
calling the protection command by executing the control command as a call of the protection command.

10. The non-transitory computer-readable medium of claim 6, wherein
the control command is a library file included in the application as a call of the protection command; and
the calling the protection command comprises calling the protection command by executing the control command for the desired file.

11. A file protection method of an electronic device, the method comprising:
executing, using at least one processor, an application installed on the electronic device;
providing, using the at least one processor, a service based on a service code of the application;
calling, using the at least one processor, a protection command for a desired file included in a file protection module that is included in the application, in response to execution of a control command for a desired file that is controlled by the application; and
processing, using the at least one processor, control of the desired file and integrity verification associated with data stored in the desired file in response to the called protection command; and wherein
the control command for the desired file includes at least one of an open command, a read command, and a write command for the desired file;

when the control command is the open command or the read command, the processing control of the desired file comprises:
verifying the integrity of the desired file by opening or reading the desired file through the protection command called in response to the open command or the read command,
creating a hash value of the opened or read desired file, and
comparing the created hash value to a previously stored hash value stored; and
when the control command is the write command, the processing control of the desired file comprises:
processing the write command for the desired file through the protection command,
creating a hash value of the written desired file, and
updating the stored hash value with the created hash value.

12. The method of claim 11, wherein the control command for the desired file is included in the service code of the application to call the protection command through a software development kit (SDK).

13. The method of claim 11, wherein the processing control of the desired file comprises processing the control for the desired file and verifying the integrity of the desired file through comparison of a hash value stored in association with the desired file.

14. The method of claim 11, wherein the calling the protection command comprises:
verifying whether the control command for the desired file is executed through a call stack or a register, under control of the file protection module; and
calling the protection command by executing the control command as a call of the protection command.

15. The method of claim 11, wherein
the control command is a library file included in the application as a call of the protection command; and
the calling protection command comprises calling the protection command by executing the control command for the desired file.

* * * * *